(12) United States Patent
Park et al.

(10) Patent No.: US 7,019,756 B2
(45) Date of Patent: Mar. 28, 2006

(54) APPARATUS AND METHOD FOR BRIGHTNESS CONTROL

(75) Inventors: Yung-Jun Park, Gyunggi-do (KR); Seung-Joon Yang, Gyunggi-do (KR); Jae-Hwan Oh, Gyunggi-do (KR); Hyun Kang, Gyunggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/724,058

(22) Filed: Dec. 1, 2003

(65) Prior Publication Data

US 2004/0109612 A1   Jun. 10, 2004

Related U.S. Application Data

(60) Provisional application No. 60/430,334, filed on Dec. 3, 2002.

(30) Foreign Application Priority Data

Mar. 11, 2003  (KR) .................. 10-2003-0015014

(51) Int. Cl.
*G09G 5/02* (2006.01)
(52) U.S. Cl. .................. 345/589; 345/426; 345/428; 345/643; 345/690; 382/168; 382/169; 382/172; 382/271; 382/273; 348/687; 358/3.22
(58) Field of Classification Search .......... 345/643; 382/169, 172, 271, 273
See application file for complete search history.

(56) References Cited

U.S. PATENT DOCUMENTS

| 5,937,090 | A | * | 8/1999 | Kim ........................ 382/169 |
| 5,963,665 | A | * | 10/1999 | Kim et al. ................. 382/169 |
| 6,259,472 | B1 | * | 7/2001 | Park ........................ 348/28 |
| 6,507,668 | B1 | * | 1/2003 | Park ........................ 382/169 |

* cited by examiner

*Primary Examiner*—Matthew C. Bella
*Assistant Examiner*—Antonio Caschera
(74) *Attorney, Agent, or Firm*—Staas & Halsey LLP

(57) ABSTRACT

A brightness control apparatus comprising a probability density function (PDF) calculator to calculate a PDF based on pixel values of respective pixels of an input image signal, a first setter to set an upper limit value and a lower limit value with respect to the pixel values that are equal to or smaller than a predetermined level in the PDF, and a brightness value controller to calculate a cumulative distribution function for the PDF controlled by the upper and lower limit values set by the first setter, and calculating brightness levels corresponding to the input image signal based on the calculated cumulative distribution function. The brightness control apparatus controls the brightness of an image signal so as to prevent it from becoming unnecessarily bright or dark when compensating the brightness of an image signal, while also preventing degradation of contrast.

11 Claims, 7 Drawing Sheets

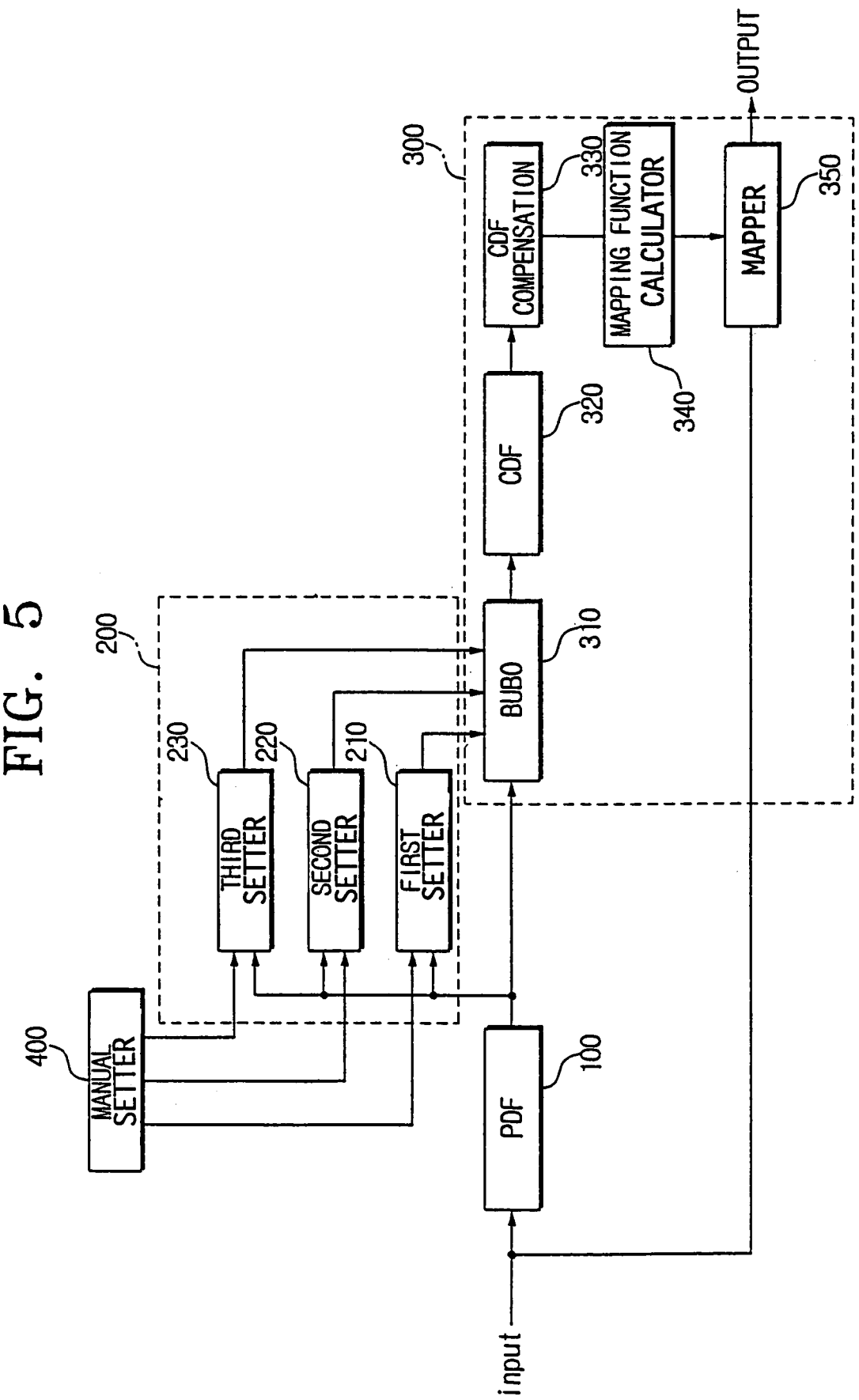

APPARATUS AND METHOD FOR BRIGHTNESS CONTROL

CROSS-REFERENCE TO RELATED APPLICATIONS

This application claims benefit of U.S. Provisional Patent Application No. 60/430,334 filed Dec. 3, 2002 in the U.S. Patent and Trademark Office, and Korean Patent Application No. 2003-15014 filed Mar. 11, 2003 in the Korean Intellectual Property Office, the disclosure of which is incorporated herein by reference.

BACKGROUND OF THE INVENTION

1. Field of the Invention

The present invention relates to a brightness level conversion apparatus, and more particularly, to a brightness control apparatus for stretching the level of brightness in the dark and bright regions of an image.

2. Description of the Related Art

Generally, when a video image signal is processed, the brightness in the image signals is frequently unbalanced or distorted. This imbalance and distortion is mainly due to varying factors such as lightings, photographing conditions, and features of a video display device. In many occasions, the brightness of the same image signal varies according to the type of video display device which reproduces the image signal. For example, when the same image signal is input and reproduced through different video display devices, the image signal can have different brightness levels in the low and high brightness regions according to characteristics of the video display device displaying the image signal. In order to control such differences in brightness, a video display device generally has an Automatic Gain Control (AGC) therein. The AGC can be automatically operated, or may be manually controlled by a user, to increase or decrease image brightness.

FIG. 1 is a block diagram for showing a conventional brightness control apparatus having an AGC.

A brightness control apparatus shown in FIG. 1 has a brightness level detector 10, an AGC 20, and a mapper 30.

The brightness level detector 10 detects the level of brightness which is used to display the low and high brightness regions of an input image signal. Using the detected brightness level, the brightness level detector 10 detects excessively low brightness in the low brightness region (generally 0~60 levels), and/or excessively high brightness in the high brightness region (generally 180~255 levels). The brightness level detector then outputs the detected results to the AGC 20.

If the brightness level detector 10 detects an image signal with a brightness that is too high to display in the low brightness region, the AGC 20 calculates a mapping function to decrease the brightness. If the brightness level detector 10 detects an image signal with a brightness that is too low to display in the high brightness region, the AGC 20 calculates a mapping function to increase the brightness.

The mapper 30 controls the brightness of the input image signal according to the mapping functions calculated in the AGC 20.

FIG. 2A and FIG. 2B are views for illustrating the operation of the AGC 20 shown in FIG. 1.

FIG. 2A shows a mapping function decreasing an excessively high brightness level in a low brightness region. As shown in FIG. 2A, the mapping function indicates a reduction in a brightness gain, which decreases the brightness of the low brightness region of an input image signal. FIG. 2B shows a mapping function increasing the brightness gain, which increases an excessively low brightness in a high brightness region.

FIG. 3A to FIG. 3C show the results of normalizing a probability distribution function (PDF), a cumulative distribution function based on the PDF, and a cumulative distribution function with respect to the automatic gain control results by FIG. 2A and FIG. 2B.

As is well known in the art, a histogram shows a distribution of brightness values of respective pixels which form an input image signal. A cumulative distribution function (CDF) is a function obtained by converting cumulative PDFs into a monotonic increasing function. Normalizing refers to the conversion of a cumulative distribution function into a relation of output brightness values with respect to input brightness values.

FIG. 3A shows a PDF of an image signal input to the brightness level detector 10. The PDF classifies the brightness of an input image signal into levels 0–255 and shows the number of pixels of each brightness level. FIG. 3B shows the result of a conversion of the PDF of FIG. 3A into a cumulative distribution function. When the input image signal has a resolution of 720×480, the input image signal has a final cumulative value of 345,600 pixels when all the PDF are accounted for. FIG. 3C shows the result of normalizing the cumulative distribution function shown in FIG. 3B. Here, the normalization result has output the brightness values corresponding to the brightness values of the input pixels.

FIG. 4A shows a PDF for an input image signal based on the brightness gain control of FIG. 2B. As shown in FIG. 4A, the number of pixels is increased in the high brightness value region A. FIG. 4B shows a result of the conversion of the PDF of FIG. 4A into a cumulative distribution function. Here, the slope of the cumulative distribution function is greatly increased in region B due to the increase in the number of pixels in the high brightness region of the PDF. FIG. 4C shows a result of normalizing the cumulative distribution function of FIG. 4B. The normalization result is obtained by converting the cumulative distribution function of FIG. 4B into a relation between input brightness and output brightness. As shown in FIG. 4C, a region C has the maximum brightness value of 255. That is, when an input image signal is mapped in and output from the mapper 30, the overall brightness of the image signal increases.

The conventional brightness value control apparatus described above has a problem in that it brightens the overall screen to unnecessary levels when the brightness gain is increased. Also, the problem of degrading contrast ratios is present since the brightness values of the pixels in the brightened region have little or no difference between them.

SUMMARY OF THE INVENTION

It is one aspect of the present invention to provide an apparatus and method for brightness control of an image signal that do not unnecessarily brighten or darken the image, and which control the brightness without causing a degradation of the contrast.

In order to achieve the above and/or other aspects and other features of the present invention, a brightness control apparatus includes: a probability density function (PDF) calculator to calculate a PDF based on pixel values of respective pixels of an input image signal; a first setter to set an upper limit value and a lower limit value with respect to the pixel values that are equal to or smaller than a predetermined level in the PDF; and a brightness value controller to calculate a cumulative distribution function for the PDF controlled by the upper and lower limit values set by the first setting unit, and to calculate brightness levels corresponding to the input image signal based on the calculated cumulative distribution function.

Further provided is a second setter to set an upper limit value and a lower limit value for the pixel values over a predetermined level in the PDF, and to output the PDF controlled by the set lower limit value to the brightness value controller.

Further provided is a third setter to set an upper limit value and a lower limit value for a range of pixel values excluded from the first and second setters.

The brightness value controller includes: a Bin Underflow Bin Overflow (BUBO) to reset the PDF according to the settings of the first and second setters; a cumulative distribution function (CDF) calculator to calculate a cumulative distribution function with respect to the re-set PDFs; a CDF compensator to compensate the calculated cumulative distribution function so that the maximum value of the function becomes the total number of pixels of the input image signal; a mapping function calculator to convert the cumulative distribution function into a mapping function for brightness levels; and a mapper to convert the pixel values of the input image signal using the mapping function.

The CDF calculator calculates the cumulative distribution function through the following formula:

$$CDF(K) = \sum_{t=0}^{k} PDF(t)$$

Where, CDF(K) denotes a cumulative distribution function, PDF(t) is a PDF function, and k is the maximum pixel value.

The CDF compensator compensates the calculated cumulative distribution function using the following formula so that the maximum value of the function becomes the total number of pixels that the input image signal has:

$$CPF'(K) = CDF(K) - \frac{CDF(N-1)}{N-1}K + F(K),$$

where, CDF'(K) denotes a compensated cumulative distribution function, CDF(K) is a cumulative distribution function before compensation, F(K)=(the total number of pixels of an image signal/(N−1))K, N−1 is the maximum pixel value, and CDF(N−1) is a cumulative distribution function value at the maximum pixel value.

The mapping function calculator converts the cumulative distribution function into a mapping function for the brightness levels through the following formula:

$$G(K) = CDF'(K) \times \frac{\text{Maximum Luminance}}{\text{Number of total image signal pixels}}$$

where G(K) denotes a mapping function, and CDF'(K) denotes a compensated cumulative distribution function.

The pixel value can be a grayscale value of three primary colors R, G, B, or a grayscale value of color difference signals Y, Cb, Cr.

According to an aspect of the present invention, a brightness level stretching method includes: calculating a PDF based on pixel values of respective pixels of an input image signal; setting an upper limit value and a lower limit value with respect to the pixel values which are equal to or smaller than a predetermined level in the PDF; calculating a cumulative distribution function for the PDF controlled by the set upper and lower limit values; and calculating brightness levels corresponding to the input image signal based on the calculated cumulative distribution function.

Setting the upper and lower limit values involves setting an upper limit value and a lower limit value for the pixel values of a predetermined level in the PDF.

Calculating the brightness levels involves: re-setting the PDF according to the upper and lower limit values corresponding to the settings by the first and second s setters; calculating a cumulative distribution function with respect to the re-set PDFs; adjusting the calculated cumulative distribution function sequentially so that the maximum value of the function becomes the total number of the pixels of the input image signal; converting the cumulative distribution function into a mapping function for brightness levels; and mapping the input image signal using the mapping function.

The cumulative distribution function is calculated using the following formula:

$$CDF(K) = \sum_{t=0}^{k} PDF(t),$$

where, CDF(K) denotes a cumulative distribution function, PDF(t) is a PDF function, and k is a maximum pixel value.

The calculated cumulative distribution function is adjusted so that the maximum value of the function becomes the total number of pixels included in the input image signal using the following function:

$$CPF'(K) = CDF(K) - \frac{CDF(N-1)}{N-1}K + F(K),$$

CDF'(K) denotes a compensated cumulative distribution function. CDF(K) is a cumulative distribution function before compensation. F(K)=(the total number of pixels of an image signal/(N−1))K. N−1 is the maximum pixel value. CDF(N−1) is a cumulative distribution function value at the maximum pixel value.

The cumulative distribution function is converted into a mapping function for the brightness levels using the following formula:

$$G(K) = CDF'(K) \times \frac{\text{Maximum Luminance}}{\text{Number of total image signal pixels}}$$

G(K) denotes a mapping function. CDF'(K) denotes a compensated cumulative distribution function.

The pixel value can be a grayscale value of three primary colors R, G, and B, or a grayscale value of color difference signals Y, Cb, and Cr.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

The invention will be described in detail with reference to the following drawings in which like reference numerals refer to like elements, and wherein:

FIG. 5 is a block diagram showing a brightness control apparatus according to an embodiment of the present invention;

DETAILED DESCRIPTION OF THE EMBODIMENTS

Figure 1:
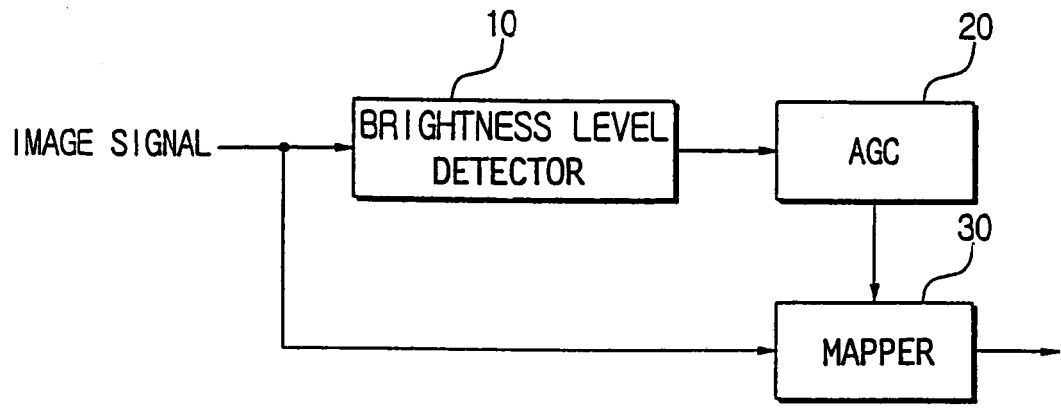
FIG. 1 is a block diagram for showing a conventional brightness control apparatus with an AGC.
Figure 2A:
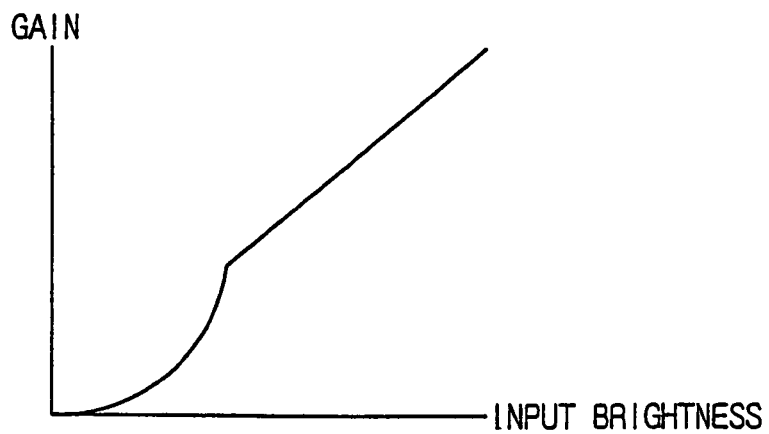
FIG. 2A and FIG. 2B are views for illustrating the operation of the AGC shown in FIG. 1.
Figure 2B:
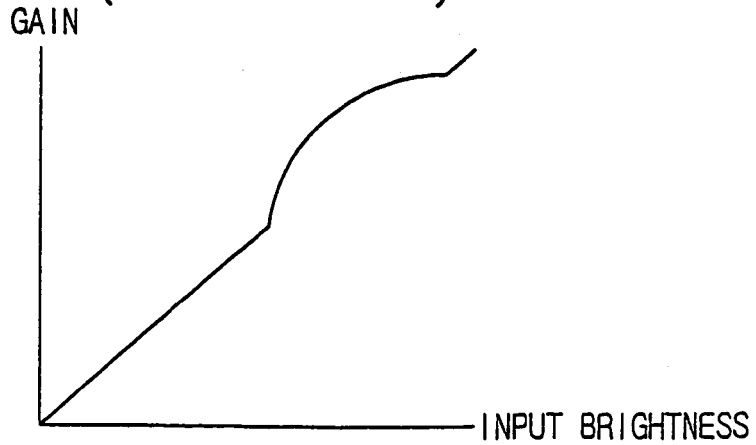
Figure 3A:
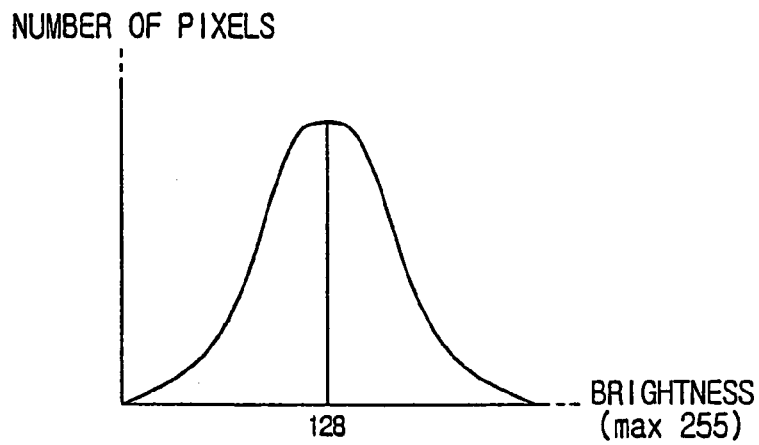
FIG. 3A to FIG. 3C are views showing the results of normalizing a PDF, a cumulative distribution function based on the PDF, and a cumulative distribution function with respect to the automatic gain control results of FIG. 2A and FIG. 2B.
Figure 3B:
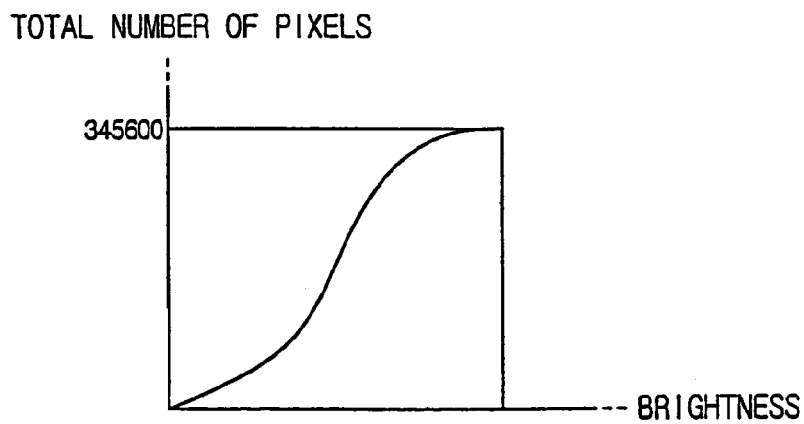
Figure 3C:
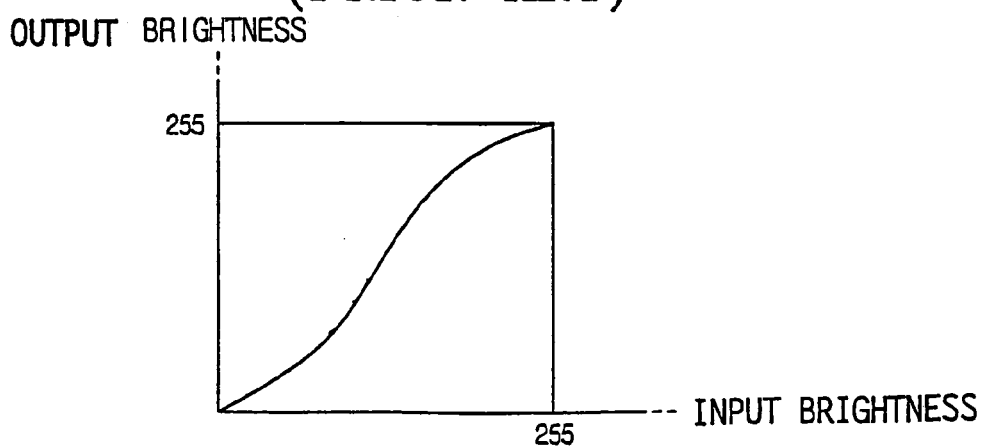
Figure 4A:
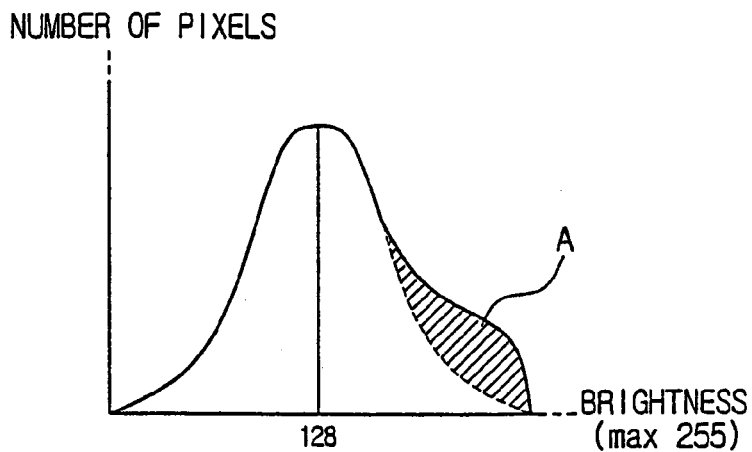
FIG. 4A is a view showing a PDF for an input image signal based on the brightness gain control of FIG. 2B.
Figure 4B:
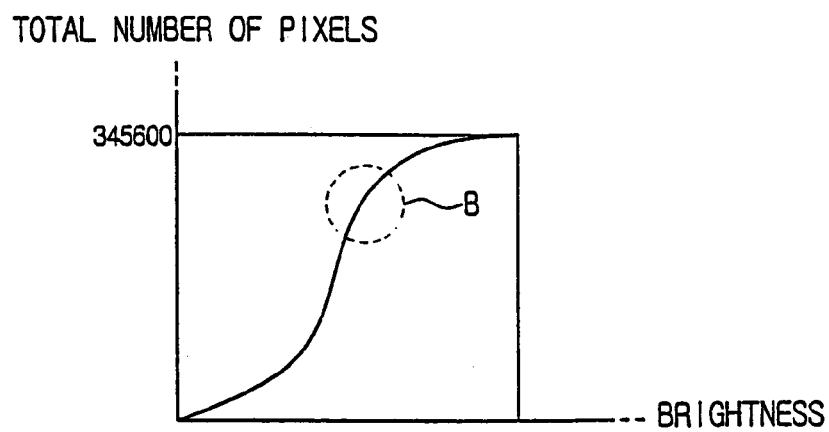
FIG. 4B is a view showing the a result of the conversion of the PDF of FIG. 4A into a cumulative distribution function.
Figure 4C:
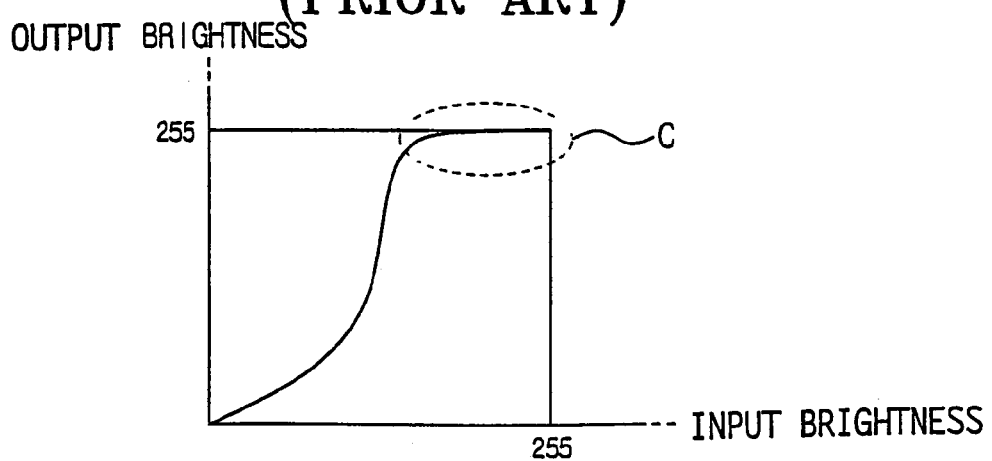
FIG. 4C is a view showing the result of normalizing the cumulative distribution function of FIG. 4B.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 5 is a block diagram of a brightness control apparatus according to an embodiment of the present invention.

The brightness control apparatus shown in FIG. 5 has a probability density function (PDF) calculator 100, a threshold value setter 200, and a brightness value controller 300.

The PDF calculator 100 detects pixel values of the respective pixels of an input image signal, and accordingly calculates the PDF. The pixel value can be the grayscale value of three primary colors R, G, and B, or the grayscale value of color difference signals Y, Cb, and Cr. The grayscale value can be based on hue, saturation, and brightness. Representing the grayscale value by 8-bits will render the primary colors R, G, and B and the saturation in 256 levels (i.e., $2^8$ levels). The brightness value can also be expressed by 256 levels. The color difference signals Y, Cb, and Cr can be expressed by 8 bits, respectively. Accordingly, the brightness value, the grayscale value of the primary color signals, and the grayscale value of the color difference signal are varied in accordance with the variation of the brightness value by the input image signal. The PDF corresponding to the variation of the brightness of the input image signal can be calculated. In the following description, the brightness control apparatus according to an aspect of the present invention will be described mainly with reference to the brightness value of the input image signal. However, it should be noted that the present invention is equally applicable to the grayscale values of the three primary colors R, G, and B, as well as the color difference signals.

The threshold value setter 200 divides the PDF obtained from the PDF calculator 100 into three regions based on brightness values, and sets different upper values and lower values for the respective regions. For example, the threshold value setter 200 detects a brightness region having a number of pixels corresponding to the lower 10% of the calculated PDF, and applies pre-set upper and lower limit values. The threshold value setter 200 also allows the upper and lower limit values of the detected brightness region to be set manually. Likewise, the threshold value setter 200 detects brightness regions corresponding to the number of pixels of the upper 10% and the remaining region having pixels ranging from the lower 11% to the upper 89% of the PDF, and applies pre-set upper and lower limit values, or allows the upper and lower limit values to the detected brightness regions to be set manually. The upper value is a set value limiting the maximum value of a PDF. When the PDF exceeds the upper value, the PDF is adjusted so that it is below the upper values. Similarly, the lower value is a set value limiting the minimum value of a PDF when a PDF value is below the lower value, the PDF is adjusted so that it is above the lower value.

The brightness value controller 300 adjusts the PDF calculated by the PDF calculator 100 using the threshold value setter 200, and calculates a mapping function based on the re-set PDF.

In FIG. 5, the threshold value setter 200 has a first setter 210, a second setter 220, and a third setter 230. The present invention can have more or less setters depending on the number of brightness regions being used.

The first setter 210 detects a brightness region having the pixels corresponding to the lower 10% of the calculated PDF, and outputs pre-set upper and lower limit values for the detected brightness region to the brightness value controller 300. The first setter 210 either uses stored upper and lower limit values that correspond to the lower 10% of a PDF, or the first setter 200 can use upper and lower limit values that are input using the manual setter 400. The upper and lower limit values are applied to a brightness region corresponding to the lower 10% of the PDF. Here, the Applicant refers to the lower 10% as an example for easy understanding. The numbers provided throughout the description of the invention are merely examples. It should be understood that the invention is not limited to the numbers of the lower 10%, upper 10%, and lower 11% to upper 89% only. Multiple brightness regions may be utilized. The pixels may be divided between the brightness regions as is convenient.

The second setter 220 detects a brightness region having a number of pixels corresponding to the upper 10% of the calculated PDF, and outputs pre-set upper and lower limit values of the detected brightness region to the brightness value controller 300.

The third setter 230 detects a brightness region having a number of pixels ranging from the lower 11% to the upper 89% of the calculated PDF, and outputs pre-set upper and lower limit values of the detected brightness region to the brightness value controller 300. Here, the second and third setters 220 and 230 comprise upper and lower limit values corresponding to the upper 10% and the range between the lower 11% to the upper 89% respectively. The second and/or third setters 220 and 230 can input these values to the brightness value controller 300, or the values that can be manually entered using the manual setter 400.

The brightness value controller 300 has a Bin underflow Bin overflow (BUBO) 310, a cumulative distribution function (CDF) calculator 320, a CDF compensator 330, a mapping function calculator 340, and a mapper 350.

The BUBO 310 adjusts an input PDF based on upper and lower limit values set by the first, second, and third setters 210, 220, and 230. For example, the BUBO 310 increases and decreases brightness values of a brightness region corresponding to the number of pixels of the lower 10% according to the upper and lower limit values set by the first setter 210, brightness values of a brightness region corresponding to the number of pixels of the upper 10% according to the upper and lower limit values set by the second setter 220, and the brightness values of a brightness region corresponding to the number of pixels ranging from the lower 11% to the upper 89% according to the upper and lower limit values set by the third setter 280. At this time, the upper limit value for the brightness region corresponding to the pixels ranging from the lower 11% to the upper 89% of the PDF, that is, the upper limit value of the third setter 230, is higher than the upper limit values that the first setter 210 and the second setter 220, and the lower value of the third setter 230 is set higher than the lower limit value of the first setter 210 and the second setter 220. Accordingly, the lower limit values of the first setter 210 and the second setter 220 are lower than the lower limit value of the third setter 230. Therefore, compensation values for a low brightness region (a region having low brightness values) and a high brightness region (a region having high brightness values) become smaller than those for a region compensated by the third setter 230. Accordingly, brightness distributions for the low and high brightness regions are stretched, as will be described in detail later.

The CDF calculator 320 accumulates the PDFs which are adjusted by the BUBO 310, sequentially. Accordingly, a cumulative distribution function output from the CDF calculator 320 becomes a monotonic increasing function, which is expressed by the equation as shown in Formula 1 as follows:

$$CDF(K) = \sum_{t=0}^{k} PDF(t)$$

where, CDF(K) denotes a cumulative distribution function, PDF(t) is a PDF function, and t is a maximum brightness value.

The CDF compensator 330 adjusts the maximum function value of a cumulative distribution function calculated from the CDF calculator 320 so that the maximum function value becomes the total number of pixels of the input image signal. Accordingly, the CDF compensator 330 prevents a cumulative distribution function from being distorted due to a PDF increased and decreased by the BUBO 310. This can be expressed in Formula 2 as follows:

$$CPF'(K) = CDF(K) - \frac{CDF(N-1)}{N-1}K + F(K),$$

where, CDF'(K) denotes a compensated cumulative distribution function, CDF(K) is a cumulative distribution function before compensation, F (K)=(the total number of pixels of an image signal/(N−1))K, N−1 is the maximum brightness value, and CDF(N−1) is a cumulative distribution function value at the maximum brightness value.

The mapping function calculator 340 converts a function for brightness levels and the number of pixels, that is, a cumulative distribution function, into brightness levels of an input image signal and a function for the output brightness levels corresponding to the image signal brightness levels, which is expressed in Formula 3 as follows:

$$G(K) = CDF'(K) \times \frac{\text{Maximum Luminance}}{\text{Number of total image signal pixels}}$$

where, G(K) denotes a mapping function, and CDF'(K) denotes a compensated cumulative distribution function.

The mapper 350 maps brightness levels of an input image signal based on a mapping function calculated in Formula 3.

FIGS. 6A to 6F are views explaining brightness stretching by the BUBO unit 310 for low and high brightness regions.

Figure 6A:
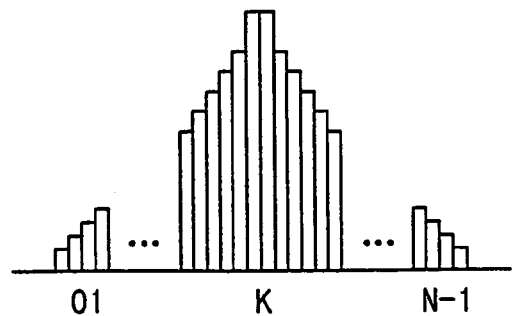
FIG. 6A through FIG. 6F are views showing brightness stretching with respect to low and high brightness regions by a histogram controller.

FIG. 6A is a view showing a histogram of a PDF of an input image signal.

Figure 6B:
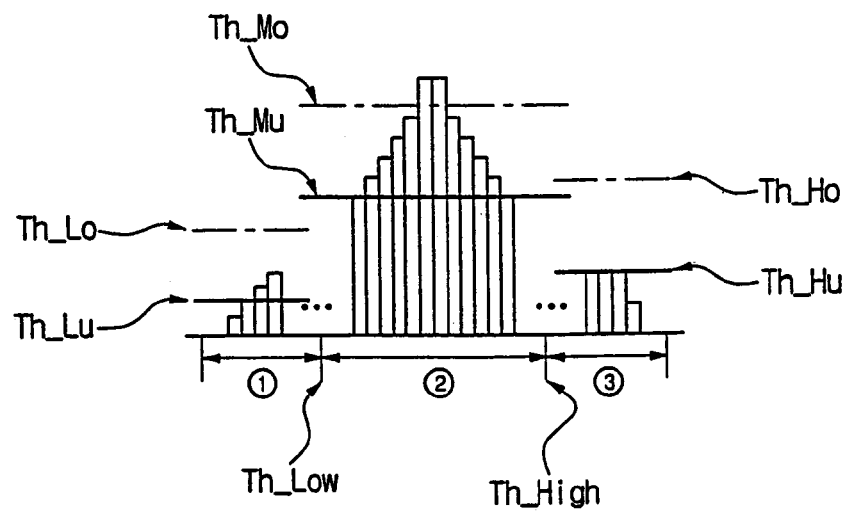

FIG. 6B is a view showing a histogram of a PDF obtained by adjusting the PDF shown in FIG. 6A based on the upper and lower limit values provided from the first, second, and third setters 210, 220, and 230. The first setter 210 detects a region having 10% of the total pixels forming an image signal, the pixels being distributed over a low brightness region. In FIG. 6B, a region ① denotes a region with 10% of total pixels. The BUBO 310 applies to the region ① an upper limit value Th_LO and a lower limit value Th_LU which are provided by the first setter 210. As a result of the application, the PDF of the region ① is mapped into the upper limit value Th_LO in PDF regions exceeding the upper limit value Th_LO, and to the lower limit value Th_LU in PDF regions under the lower limit value Th_LU.

The second setter 220 detects a region having 10% of the total pixels forming an image signal, the pixels being distributed over a high brightness region. In FIG. 6B, a region ③ corresponds to the high brightness region. The BUBO 310 applies to the region ③ an upper limit value Th_HO and a lower limit value Th_HU provided by the second setter 220. As a result of the application, the PDF of the region ③ is mapped into the upper limit value Th_HO in PDF regions exceeding the upper limit value Th_HO, and into the lower limit value Th_HU in PDF regions under the lower limit value Th_HU. Similarly, the third setter 230 applies an upper limit value Th_Mo and a lower limit value Th_MU to a medium brightness region ②.

Figure 6C:
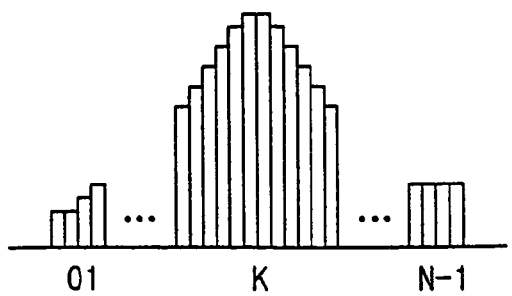

FIG. 6C is a view showing a histogram of the PDF adjusted in FIG. 6B. As shown in FIG. 6C, the PDF in region ① is slightly increased, the PDF in region ② is decreased, and the PDF region ③ is slightly increased.

Figure 6D:
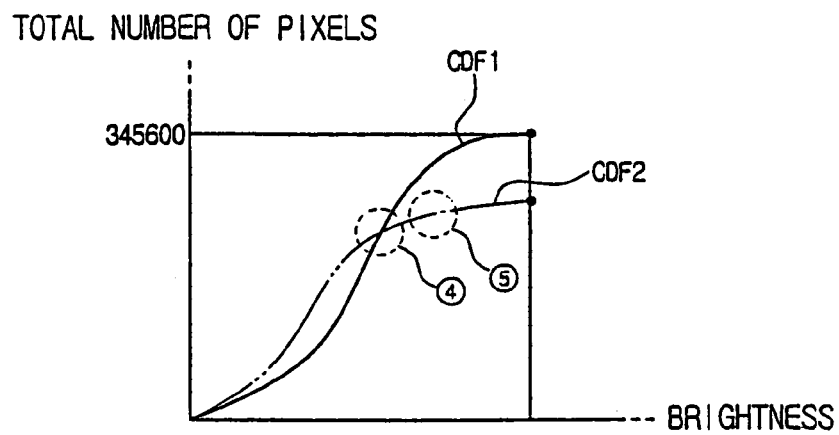

FIG. 6D is a view showing a cumulative distribution function CDF1 for an input image signal shown in FIG. 6A and a cumulative distribution function CDF2 based on the PDF adjusted in FIG. 6C. As shown in FIG. 6D, the cumulative distribution function CDF1 has the total number of pixels as a final value since it is obtained from adding all the PDF of the input image signal. For example, if an input image signal has a resolution of 720×480, the final value of the cumulative distribution function CDF1 becomes 345600. However, the cumulative distribution function CDF2 does not have 345600 as a final value since a region of the PDF ② has been decreased, i.e. region ②, as shown in FIG. 6B.

Thus the cumulative distribution function CDF2 has a lesser slope than the cumulative distribution function CDF1 in brightness region ④. Further, the cumulative distribution function CDF2 has a lesser slope in region ⑤. By normalization, region ⑤ has a stretching effect in a high brightness region.

Figure 6E:
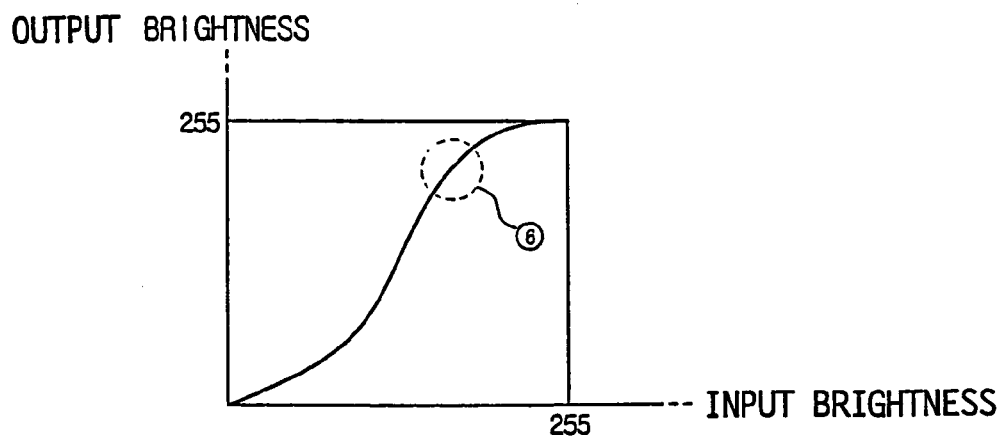
Figure 6F:
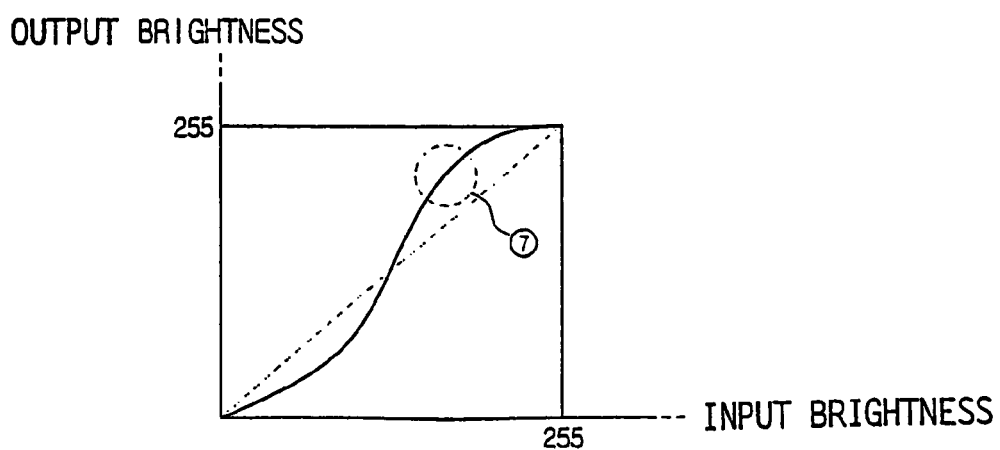

FIG. 6E and FIG. 6F are views showing the normalization results for the cumulative distribution function CDF1 and the cumulative distribution function CDF2, respectively. The normalization converts the cumulative distribution function CDF1 or CDF2 into a relation of output brightness values with respect to input brightness values, as expressed in Formula 3 as shown above.

In FIG. 6E and FIG. 6F, it can be seen that the slope of the region ⑦ of FIG. 6F becomes greater than that of the region ⑥ of FIG. 6E. This is a result of the shallow slope of the cumulative distribution function CDF2 being compensated according to Formula 1. This shows that contrast is not degraded while the high brightness region is stretched.

Figure 7:
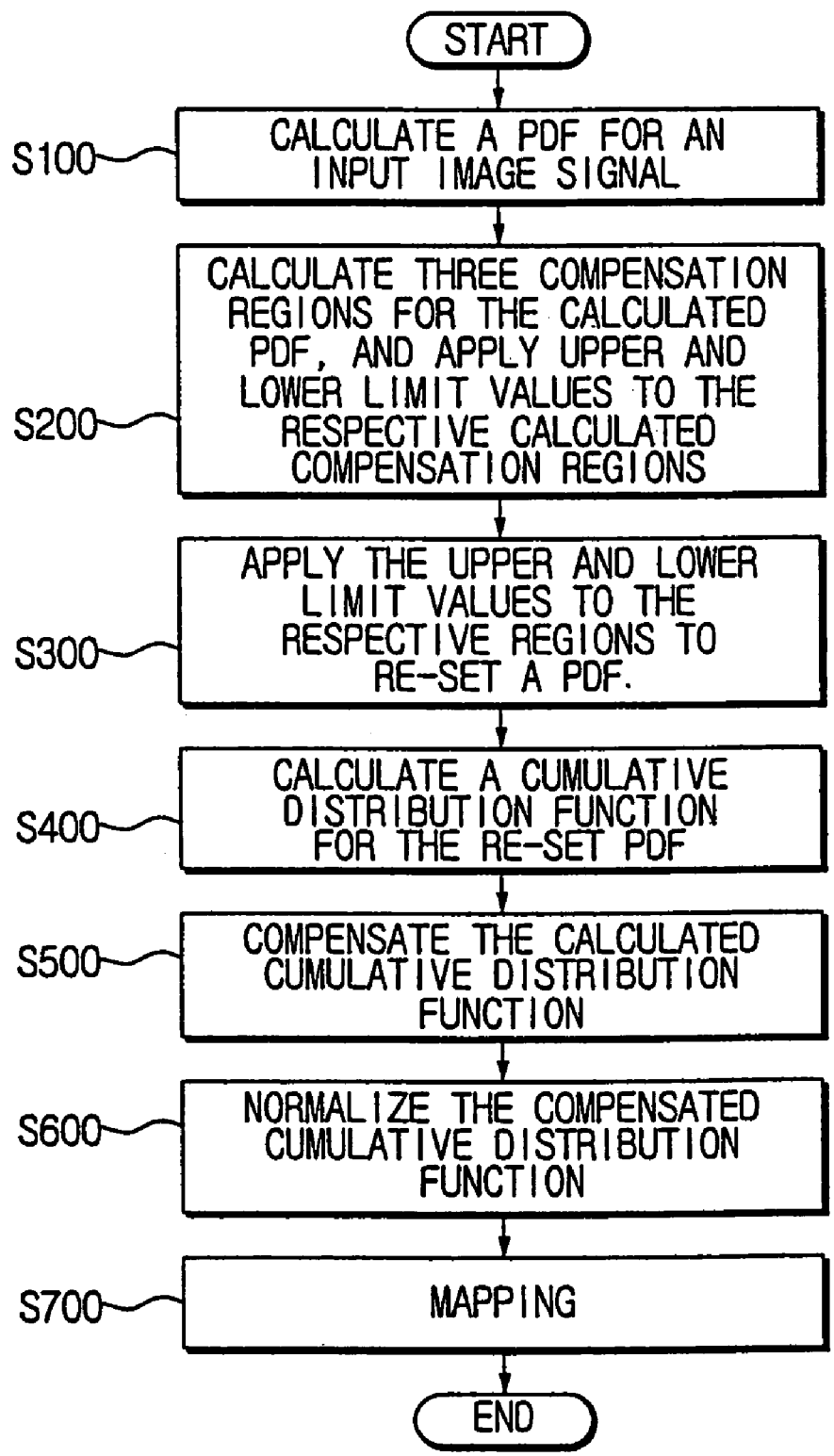
FIG. 7 is a flow chart showing a brightness control method according to an embodiment of the present invention.

FIG. 7 is a flow chart for showing a brightness control method according to an aspect of the present invention.

First, the PDF calculator 100 calculates the PDF based on the pixel values of the respective pixels which form the input image signal (S100). The pixel value can be a grayscale value of three primary colors R, G, and B, or a grayscale value of color difference signals Y, Cb, and Cr. Also, the grayscale value can be based on hue, saturation, and brightness. Representing the grayscale value by 8-bits will render the primary colors R, G, and B, as well as the saturation in 256 levels (i.e., $2^8$ levels). The brightness value can also be expressed by 256 levels, and the color difference signals Y, Cb, and Cr can be expressed by 8 bits, respectively. Accordingly, the brightness value, grayscale value of the primary color signals, and grayscale value of the color difference signal are varied in accordance with the variation of the brightness value of the input image signal. The PDF corresponding to the variation of brightness of input image signal can be calculated. In the following description, the brightness control apparatus according to an aspect of the present invention will be described mainly with reference to the brightness value of the input image signal. However, it should be noted that the present invention is equally applicable to the grayscale values of the three primary colors R, G, and B as well as the color difference signals.

Next, the first, second, and third setters 210, 220, and 230 divide the PDF calculated from the PDF calculator 100 into three regions. For example, the first setter 210 detects brightness levels when the number of pixels corresponding to a low brightness region is 10% of the PDF output from the PDF calculator 100, and sets an upper and lower limit values, the second setter 220 detects brightness levels when the number of pixels corresponding to a high brightness region is 10% of the PDF output from the PDF calculator 100, and sets upper and lower limit values which are stored in advance, and, similarly, the third setter 230 sets upper and lower limit values stored in advance with respect to the lower 11% through 89% of the brightness levels (S200). Next, the first, second, and third setters 210, 220, and 230 apply their setting values (upper and lower limit values) to a brightness value controller 300. The applied setting values are applied to the BUBO 310 to adjust the PDF output from the PDF calculator 100 (S300). The CDF calculator 320 accumulates PDFs adjusted by the BUBO 310 and calculates a cumulative distribution function (S400). This is expressed in Formula 1 above. Further, the PDF output from the PDF calculator 100 is adjusted by the BUBO 310, so that a final value of the cumulative distribution function exceeds or becomes less than the number of pixels according to the resolution. Accordingly, the CDF compensator 330 matches the final function value of the cumulative distribution function output from the CDF calculator 320 with the number of pixels of resolution of an input image signal, which is expressed in Formula 2 above (S500). Next, the mapping function calculator 340 converts a cumulative distribution function compensated by Formula 2 above, that is, a cumulative distribution function which is a function for brightness levels and the number of pixels, into a function for the brightness levels of an input image signal and output brightness levels corresponding to the brightness levels of an input image signal (S600). This is generally referred to normalization, which is accomplished based on Formula 3 above.

Lastly, the mapper 350 maps the brightness levels of an input image signal based on a mapping function calculated in the mapping function calculator 340 (S700). Accordingly, the brightness control method can control brightness to prevent it from becoming excessively bright or dark as the brightness levels of an input image signal are compensated, while avoiding degradation of contrast.

As stated above, the present invention controls the brightness of an image signal to prevent it from becoming excessively bright or dark when compensating the brightness of an image signal, while preventing any deterioration of contrast.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A brightness control apparatus, comprising:
a probability density function calculator to calculate a probability density function based on pixel values of respective pixels of an input image signal;
a first setter to set a first upper limit value and a first lower limit value with respect to the pixel values over a first predetermined level in the probability density function;
a second setter to set a second upper limit value and a second lower limit value for the pixel values over a second predetermined level in the probability density function;
a third setter to set an upper limit value and a lower limit value for a range of pixel values not covered by either the first setter or the second setter; and
a brightness value controller to calculate a cumulative distribution function for the probability density function controlled by the first upper limit value and the first lower limit value set by the first setter, and to calculate brightness levels corresponding to the input image signal based on the calculated cumulative distribution function,
wherein the second setter outputs the probability density function controlled by the set second upper limit value and the second lower limit value to the brightness value controller, and
wherein a mapping function calculator converts the cumulative distribution function into a mapping function for the brightness levels using a formula as follows:

$$G(K) = CDF'(K) \times \frac{\text{Maximum Luminance}}{\text{Number of total image signal pixels}},$$

G(K) denoting a mapping function, and CDF'(K) denoting a compensated cumulative distribution function.

2. The brightness control apparatus of claim 1, wherein the pixel value includes the brightness value, a grayscale value of three primary colors R, G, and B, and/or a grayscale value of color difference signals Y, Cb, and Cr.

3. A brightness control apparatus, comprising:
a probability density function calculator to calculate a probability density function based on pixel values of respective pixels of an input image signal;
a first setter to set a first upper limit value and a first lower limit value with respect to the pixel values over a first predetermined level in the probability density function;
a second setter to set a second upper limit value and a second lower limit value for the pixel values over a second predetermined level in the probability density function;
a third setter to set an upper limit value and a lower limit value for a range of pixel values not covered by either the first setter or the second setter; and
a brightness value controller to calculate a cumulative distribution function for the probability density function controlled by the first upper limit value and the first lower limit value set by the first setter, and to calculate brightness levels corresponding to the input image signal based on the calculated cumulative distribution function,
wherein the second setter outputs the probability density function controlled by the set second upper limit value and the second lower limit value to the brightness value controller, and
wherein the brightness value controller includes:
a Bin Underflow Bin Overflow to adjust the probability density function according to the upper value limits and the lower value limits set by the first setter, the second setter, and the third setter, respectively;
a cumulative distribution function calculator to calculate the cumulative distribution function with respect to the adjusted probability density function;
a cumulative distribution function compensator to compensate the calculated cumulative distribution function so that a maximum value of the function becomes a total number of pixels of the input image signal;
a mapping function calculator to convert the cumulative distribution function into a mapping function for brightness levels; and
a mapper to convert the pixel values of the input image signal according to the mapping function.

4. The brightness control apparatus of claim 3, wherein the cumulative distribution function calculator calculates the cumulative distribution function using a formula as follows:

$$CDF(K) = \sum_{t=0}^{k} PDF(t)$$

where, CDF(K) denotes a cumulative distribution function, PDF(t) is the probability density function, and k is a maximum pixel value.

5. The brightness control apparatus of claim 3, wherein the cumulative distribution function compensator compensates the calculated cumulative distribution function such that a maximum pixel value of the function becomes a total number of pixels of the input image signal using a formula as follows:

$$CPF'(K) = CDF(K) - \frac{CDF(N-1)}{N-1}K + F(K),$$

where, CDF'(K) denotes a compensated cumulative distribution function, CDF(K) is the cumulative distribution function before compensation, F(K)=(the total number of pixels of an image signal/(N−1))K, N−1 is the maximum pixel value, and CDF(N−1) is the cumulative distribution function value at the maximum pixel value.

6. A brightness level stretching method, comprising:
calculating a probability density function based on pixel values of respective pixels of an input image signal
setting a first upper limit value and a first lower limit value with respect to pixel values which are equal to or smaller than a first predetermined level in the probability density function;
setting a second upper limit value and a second lower limit value with respect to pixel values over a second predetermined level in the probability density function;
setting a third upper limit value and a third lower limit value for a range of pixel values not covered in either the first setting or the second setting;
calculating a cumulative distribution function for the probability density function controlled by the set first upper limit value and the set first lower limit value; and
calculating brightness levels corresponding to the input image signal based on the calculated cumulative distribution function by adjusting the probability density function according to the first, second and third upper value limits and the first, second and third lower value limits.

7. The brightness level stretching method of claim 6, wherein the pixel value comprises the brightness value, a grayscale value of three primary colors R, G, and B, and/or a grayscale value of color difference signals Y, Cb, and Cr.

8. A brightness level stretching method, comprising the steps of:
calculating a probability density function based on pixel values of respective pixels of an input image signal;
setting a first upper limit value and a first lower limit value with respect to pixel values which are equal to or smaller than a first predetermined level in the probability density function;
calculating a cumulative distribution function for the probability density function controlled by the set first upper limit value and the set first lower limit value;
and calculating brightness levels corresponding to the input image signal based on the calculated cumulative distribution function,
wherein the step for calculating the brightness levels includes:
adjusting the probability density function according to the first upper limit value, the first lower limit value, a second upper limit value, and a second lower limit value;
calculating a cumulative distribution function with respect to the adjusted probability density function;

compensating the calculated cumulative distribution function sequentially so that a maximum pixel value of the function becomes a total number of the pixels of the input image signal;

converting the cumulative distribution function into a mapping function for brightness levels; and mapping the input image signal using the mapping function.

9. The brightness level stretching method of claim 8, wherein the step for calculating the cumulative distribution function calculates the cumulative distribution function using a formula as follows:

$$CDF(K) = \sum_{t=0}^{k} PDF(t),$$

where, CDF(K) denotes the cumulative distribution function, PDF(t) is the probability density function, and k is the maximum pixel value.

10. The brightness level stretching method of claim 8, wherein compensating the calculated cumulative distribution function comprises compensating the calculated cumulative distribution function using a formula as follows:

$$CPF'(K) = CDF(K) - \frac{CDF(N-1)}{N-1}K + F(K),$$

where, CDF'(K) denotes a compensated cumulative distribution function, CDF(K) is the cumulative distribution function before compensation, F(K)=(the total number of pixels of an image signal/(N−1))K, N−1 is the maximum pixel value, and CDF(N−1) is the cumulative distribution function value at the maximum pixel value.

11. The brightness level stretching method of claim 8, converting the cumulative distribution function into a mapping function comprises using a formula as follows:

$$G(K) = CDF'(K) \times \frac{\text{Maximum Luminance}}{\text{Number of total image signal pixels}},$$

where G(K) denotes the mapping function, and CDF'(K) denotes the compensated cumulative distribution function.

* * * * *

UNITED STATES PATENT AND TRADEMARK OFFICE
CERTIFICATE OF CORRECTION

PATENT NO. : 7,019,756 B2  Page 1 of 1
APPLICATION NO. : 10/724058
DATED : March 28, 2006
INVENTOR(S) : Yung-jun Park et al.

It is certified that error appears in the above-identified patent and that said Letters Patent is hereby corrected as shown below:

Col. 11, Line 58, after "PDF(t)" insert --,--.
Col. 12, Line 19, after "signal" insert --;--.
Col. 14, Line 22, after "where" insert --,--.

Signed and Sealed this

Twenty-fourth Day of October, 2006

JON W. DUDAS
*Director of the United States Patent and Trademark Office*